W. J. GROTENHUIS.
BUMPER ATTACHING BRACKET.
APPLICATION FILED AUG. 24, 1921.
1,413,222.
Patented Apr. 18, 1922.
2 SHEETS—SHEET 1.
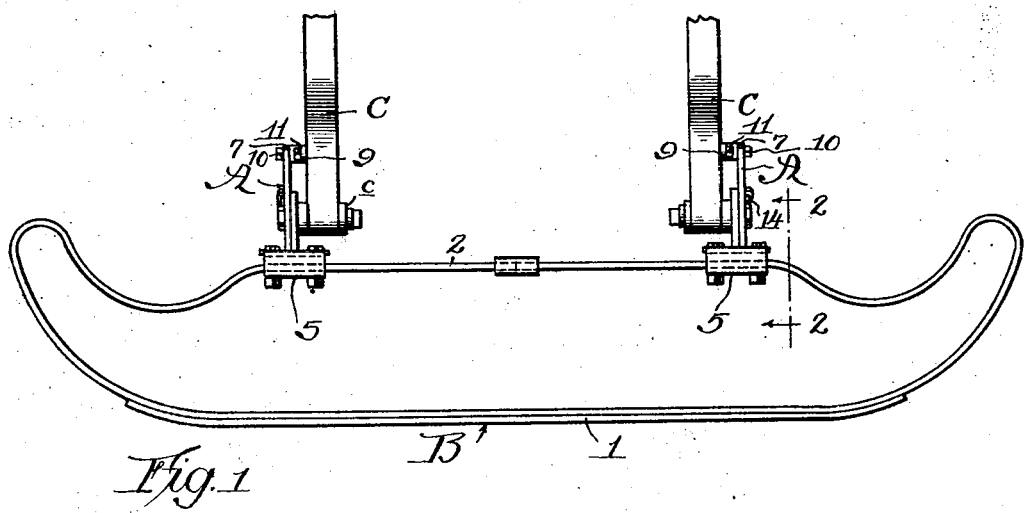
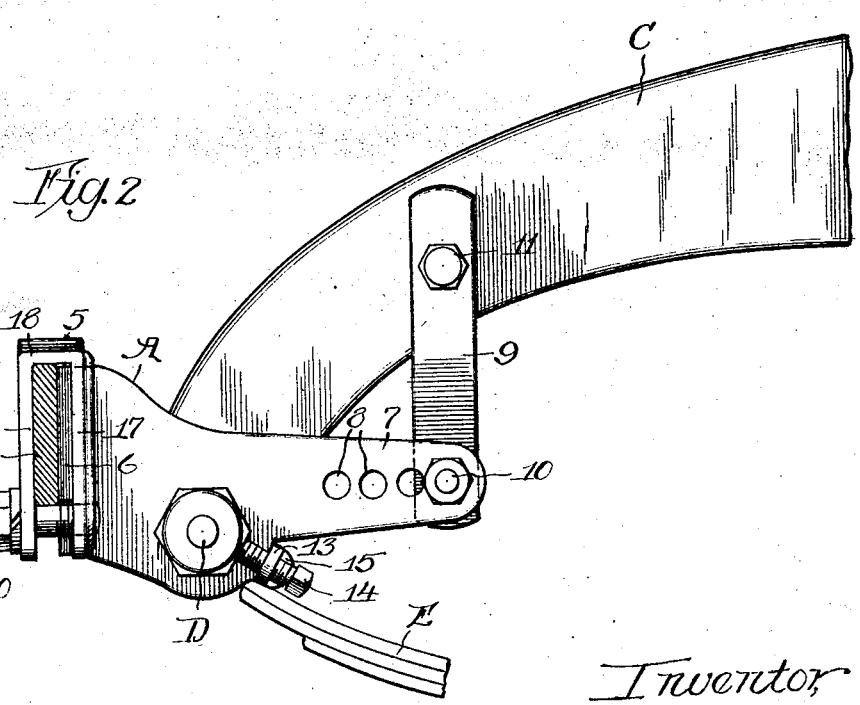
Inventor,
William J. Grotenhuis.

W. J. GROTENHUIS.
BUMPER ATTACHING BRACKET.
APPLICATION FILED AUG. 24, 1921.
1,413,222.
Patented Apr. 18, 1922.
2 SHEETS—SHEET 2.
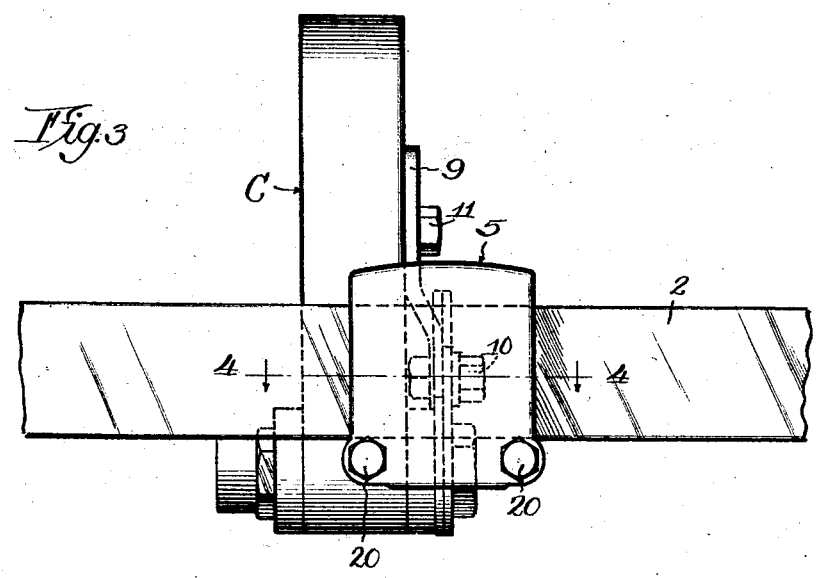
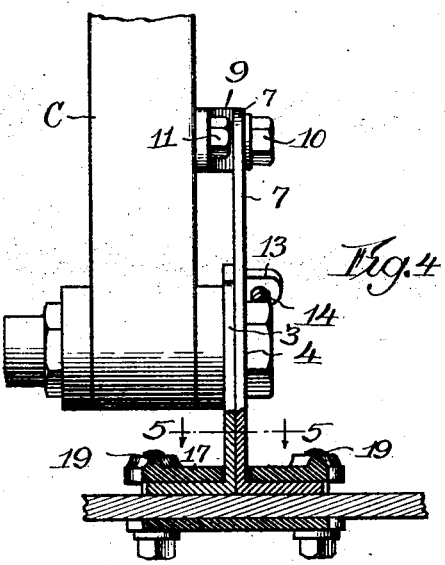
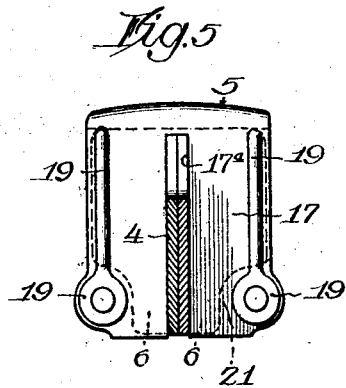
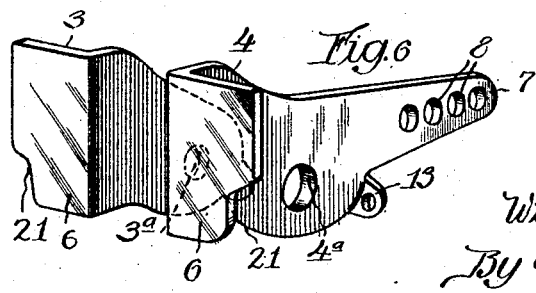
Inventor,
William J. Grotenhuis,
By Offield, Towle, Linthicum & Scott, Attys.

UNITED STATES PATENT OFFICE.

WILLIAM J. GROTENHUIS, OF CHICAGO, ILLINOIS, ASSIGNOR TO BIFLEX PRODUCTS COMPANY, OF WAUKEGAN, ILLINOIS, A CORPORATION OF ILLINOIS.

BUMPER-ATTACHING BRACKET.

1,413,222.  Specification of Letters Patent.  Patented Apr. 18, 1922.

Application filed August 24, 1921. Serial No. 495,021.

*To all whom it may concern:*

Be it known that I, WILLIAM J. GROTENHUIS, a citizen of the United States, and a resident of Chicago, in the county of Cook and State of Illinois, have invented certain new and useful Improvements in Bumper-Attaching Brackets, of which the following is a specification.

This invention relates to bumper attaching brackets for automobiles, and more particularly to those parts of an automobile bumper which are used for attaching the bumper to the frame members of an automobile.

The object of the invention is to provide a simple and strong construction for a bracket which may be readily applied to an automobile with the least amount of labor, and without drilling or cutting away parts of the frame members. Inasmuch as the shock of impacts received against the bumper are transmitted to the frame through the attaching brackets, ample strength to resist the impacts is an essential quality.

A further object of the invention is to provide a construction which will more readily permit of the use of sheet metal stampings in place of castings or drop forgings, the former not only being a less expensive material, but having those qualities in a greater degree which will render the bracket members less liable to fracture under sudden impact, and permit a greater distortion without failure. The use of sheet metal as the material involves considerable departure in manufacturing methods, and likewise of structural features. It is therefore to the construction and assembly of the several parts that the present invention relates.

A preferred embodiment of the invention is fully illustrated in the accompanying drawings, which may be briefly described as follows:

Fig. 1 is a top plan view of a bumper attached to the frame members of a vehicle by the attaching brackets of the invention, Fig. 2 is an enlarged view in side elevation of the bracket as taken on line 2—2 of Figure 1, Fig. 3 is an enlarged view in front elevation of the attaching bracket as applied to a frame member of the vehicle, and supporting a portion of the bumper proper, Fig. 4 is a top plan view of the part shown in Figure 3, with a portion of the bracket in horizontal section, as taken on line 4—4 of Figure 3, Fig. 5 is a detailed view in vertical section taken on line 5—5 of Figure 4, and Fig. 6 is a perspective view of the plates constituting the body portion of the bracket, and shown separated from each other laterally.

In disclosing the invention, the brackets A—A are illustrated in Figure 1 as supporting a bumper B at the forward end of an automobile, and upon the side frame members C—C. The bumper B may be of any particular form, although preferably of that type known as the resilient bar bumper made up of bars shaped to provide a forwardly disposed impact member 1 having a rear bar 2 extending between and beyond the ends of the side frame members C—C, and directly connected or clamped to the brackets A—A.

As clearly shown in Figure 2, the forward ends of the side frame members terminate in a downwardly curved extremity at the end of which is an enlargement or frame head *c* which supports a spring bolt D, and serving as a pivotal connection between the adjacent side frame members C—C and the forward vehicle springs E.

Generally speaking, each bracket A is secured or mounted upon the frame member by means of the spring bolt D, which passes through the bracket midway between its ends, a portion thereof extending forwardly for clamping engagement with the bumper, and a portion or arm extending rearwardly and having supplementary connection with the side frame member beyond the spring bolt, thereby providing means for preventing the rotation of the bracket about the spring bolt or main point of connection.

Referring now to the construction of the bracket, the same consists of three main parts, to-wit; a pair of companion plates 3 and 4, and a clamping member 5. The plates 3 and 4 are preferably formed from sheet steel, first stamped from sheets of the material in blank form, and subsequently punched and bent into finished form. For the most part, the plates 3 and 4 are identical in conformation, having enlarged portions which bear against the frame head, and in which are punched holes 3ª and 4ª respectively, said enlarged portions being continued in a forward direction with a slight upward incline to a point such that the end of the plates clear the frame head c. At the forward end of each plate is provided a flange 5 and 6 respectively, these flanges being formed by bending the end portion of the blank at right angles and in a direction such that when the plates 3 and 4 are brought together in flatwise contact and in registering relation with each other, said flanges extend in opposite directions and lie in the same vertical plane. The chief distinction between the two plates is that one of the plates, preferably the outer one 4 with respect to the frame member C, has a rearward extension or arm 7 along which are punched a series of holes 8 spaced apart a suitable distance. It may be mentioned that the other plate may also have the same arrangement of rearwardly extending arm, although for the function it serves, a single arm is quite sufficient. Connecting the rearwardly extending arm 7 of the outermost plate 4 with the frame member C, a vertically disposed bar or link 9 is employed, said link being pivotally connected with said arm by means of a bolt 10 engaging any one of the bolt holes 8 depending upon which one will provide a more suitable connection. The upper end of the link 9 is fixed to the frame member by inserting a cap screw 11 through said link, and anchoring the same in a hole tapped in the side frame member C.

To form a complete bracket, the plates 3 and 4 are placed in flatwise contact with each other, and applied to the outer side of the frame head c after removing the nut from the adjacent end of the spring bolt, and replacing the same after the plates have been inserted over the bolt. As a preferable arrangement, however, the regular spring bolt nut is replaced by a special "flange" nut somewhat less in thickness in order to compensate for the space occupied by the plates 3 and 4 on the projecting end of the bolt. Such a nut 12 is shown, the same being the usual hexagonal shape, and preferably slightly greater in diameter than the standard nut. At a point on the body portion of the outer plate 4, and immediately below the arm 7 is formed an integral lug 13, which in the blank lies in the plane of the plate, but subsequently is struck upwardly and forwardly at right angles to the plate, thereby forming a support for the set screws 14 positioned in radial alignment with the nut 12. Thus, after the nut 12 is tightened, the set screw 14 is screwed down against the face of the nut, locking the same from rotation.

As already explained, the companion plates 3 and 4 are connected together in flatwise contact, and as a practical matter, form a unitary plate of a double thickness of sheet metal. With the exception of the rearwardly extending arm on one of the plates, the same are identical in conformation, even to the extent of providing a lug 15 on the innermost plate corresponding to the lug 13 of the outermost plate 4 serving as a support for the set screw 14. The lug 15, however, of the innermost plate, is not struck at right angles thereto, but remains in the same plane as the plate itself, and serves as a guard or protecting lug for the head of the screw 14, preventing it from being broken off by an accidental blow delivered against it.

The clamping member 5 heretofore referred to as forming one of the principal parts of the bracket, is an inverted U-shaped member, preferably a casting or forging, and consisting of parallel arms 16 and 17 connected together by a relatively short web 18. The space between the arms 16 and 17 is substantially equal to the combined thickness of the flanges 5 and 6 of the rear bar 2 of the bumper, as clearly shown in Figure 5. The outer face of the rearwardly disposed arm 17 of the clamping member is provided with a vertical slot 17$^a$ extending upwardly from the lower and free edge thereof substantially throughout its entire height. The width of the slot is equal to the combined thickness of the plates 3 and 4. In addition to the slot 17$^a$, two reinforcing webs 19—19 are struck up from the surface of the arm 17, these reinforcing webs being located adjacent the outer vertical edges, and terminate at their lower ends in bosses 19$^a$ in which are tapped holes for cap screws hereinafter to be described.

The clamping member 5 is adapted to clamp the rear bar 2 against the forwardly facing surfaces of the flanges 5 and 6, these surfaces together forming a single abutment face having the same vertical dimension as that of the bar. The clamping member is applied by passing the same downwardly over or straddling the bar 2, and flanges 5 and 6, with the rearwardly disposed arm 17 also straddling the plates 3 and 4 immediately behind said flange through the medium of the slot 17$^a$. Along the lower edge of the clamping member 5 provision is made for cap screws 20—20 adapted to pass through the outer arm 16, and to be anchored in tapped holes formed in the bosses 19 of the rearwardly disposed arm 17. As clearly shown in Figure 6, the lower corners of the flanges 5 and 6 are cut away as at 21 to permit the bolts to clear the same in passing through the arms 16 and 17, and beneath the rear bumper bar 2. By tightening up the cap screws 20, the bar 2 is tightly clamped against the abutment face formed by the flanges 5 and 6 of the companion plates.

While a construction is herein illustrated and described, it is manifest that a single plate of cast or forge metal might readily be employed having the same thickness and other dimensional, as well as structural features. For this reason, it is not my wish that the invention be limited to the specific construction disclosed, except in so far as such limitation appears in the appended claims.

1. A bumper attaching bracket comprising a bracket member consisting of two companion plates in flatwise contact with each other, adapted to be secured to the end of a vehicle frame member, each plate being bent at its forward end to provide oppositely extending flanges forming a vertical abutment face, and a clamping member carried at the end of said bracket member and adapted to secure a bumper bar flatwise against said abutment face.

2. A bumper attaching bracket comprising a bracket member consisting of two companion plates in flatwise contact with each other, adapted to be clamped flatwise against the end of a vehicle frame member, each plate being bent at its forward end to provide laterally extending flanges forming a vertical abutment face, and a U-shaped clamping member adapted to straddle said plates rearwardly of said flanges, and clamp a bumper bar flatwise against said abutment face.

3. A bumper attaching bracket comprising two companion plates of sheet metal in flatwise contact with each other, secured to the end of a vehicle frame member by means of the spring bolt thereof, said plates terminating beyond said frame member in outwardly bent flanges, forming an abutment face, and means for securing a bumper against said abutment face.

4. A bumper attaching bracket comprising two companion plates of sheet metal in flatwise contact secured to the end of a vehicle frame member by means of the spring bolt thereof, said plates terminating beyond said frame member in outwardly bent flanges, forming an abutment face, and a clamping member straddling said plates and engaging a bumper bar in flatwise contact with said abutment face.

5. A bumper attaching bracket comprising companion plates of sheet metal applied face to face forming a bracket member adapted to be secured against the end of a vehicle frame member through the medium of a bolt passing through said plates, said plates being bent at their forward ends to provide laterally extending flanges forming an abutment face, and a clamping member adapted to straddle said bracket member rearwardly of said flanges, and to clamp a bumper bar flatwise against said abutment face.

6. A bumper attaching bracket comprising two companion plates of sheet metal secured in flatwise contact with each other, to the end of a vehicle frame member by means of the spring bolt thereof, said plates extending beyond said frame member, and provided with lateral flanges forming an abutment face, one of said plates having an arm extending rearwardly from said spring bolt, and adapted to be connected to said frame member, and means for clamping a bumper against said abutment face.

7. A bumper attaching bracket comprising two companion plates of sheet metal secured in flatwise contact with each other to the end of a vehicle frame member by means of the spring bolt thereof, said plates terminating beyond said frame member in outwardly bent flanges forming an abutment face, one of said plates having a rearwardly extending arm adapted for attachment to the frame member, and a clamping member adapted to clamp a bumper bar in flatwise contact with said abutment face.

8. A bumper attaching bracket comprising companion plates of sheet metal applied face to face and clamped against the end of a vehicle frame member by means of a spring bolt, said plates being bent at their forward ends to provide laterally extending flanges, and a U-shaped clamping member provided with a slot adapted to engage said plates rearwardly of said flanges, and to clamp a bumper bar flatwise against said flanges.

In witness whereof, I hereunto subscribe my name this 18th day of August, A. D., 1921.

WILLIAM J. GROTENHUIS.